(12) United States Patent
Shigenobu et al.

(10) Patent No.: US 7,729,519 B2
(45) Date of Patent: Jun. 1, 2010

(54) ELECTRONIC APPARATUS

(75) Inventors: Naoya Shigenobu, Ome (JP); Yuichi Hirai, Ome (JP); Toshio Konno, Akiruno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/349,438

(22) Filed: Jan. 6, 2009

(65) Prior Publication Data
US 2009/0304241 A1 Dec. 10, 2009

(30) Foreign Application Priority Data
Jun. 5, 2008 (JP) ............... 2008-148440

(51) Int. Cl.
*G06K 9/00* (2006.01)
(52) U.S. Cl. .................................... 382/116
(58) Field of Classification Search ........... 382/116
See application file for complete search history.

(56) References Cited

U.S. PATENT DOCUMENTS

| 7,321,756 | B2 * | 1/2008 | Yamashita et al. | ........... 455/411 |
| 7,372,980 | B2 * | 5/2008 | Koide et al. | ................. 382/116 |
| 7,393,241 | B2 | 7/2008 | Tanaka et al. | |
| 7,544,904 | B2 | 6/2009 | Nakatani et al. | |
| 2007/0144885 | A1 | 6/2007 | Nakatani et al. | |
| 2009/0147470 | A1 | 6/2009 | Nakatani et al. | |

FOREIGN PATENT DOCUMENTS

| JP | 4-30779 | 3/1992 |
| JP | 7-263878 | 10/1995 |
| JP | 8-54975 | 2/1996 |
| JP | 2003-044201 | 2/2003 |
| JP | 2003-298791 | 10/2003 |
| JP | 2007-173111 | 5/2007 |
| JP | 2007-249901 | 9/2007 |

OTHER PUBLICATIONS

Japanese Patent Application No. 2008-148440, Notice of Reason for Rejection, mailed Apr. 14, 2009, (English translation).

* cited by examiner

*Primary Examiner*—Wes Tucker
(74) *Attorney, Agent, or Firm*—Blakely, Sokoloff, Taylor & Zafman LLP

(57) ABSTRACT

According to one embodiment, an electronic apparatus includes a housing, a pad button section and a switch board. The housing includes a cover member including an opening part. One of a first switch board on which a fingerprint authentication unit is mounted, and a second switch board on which no fingerprint authentication units are mounted is selectively adopted as the switch board. One of a first pad button section including a fingerprint authentication cover between buttons, and a second pad button section in which a pair of buttons are adjacent to each other is selectively adopted as the pad button section. The cover member is identical in shape between a case where the first pad button section is adopted and a case where the second pad button section is adopted.

9 Claims, 16 Drawing Sheets

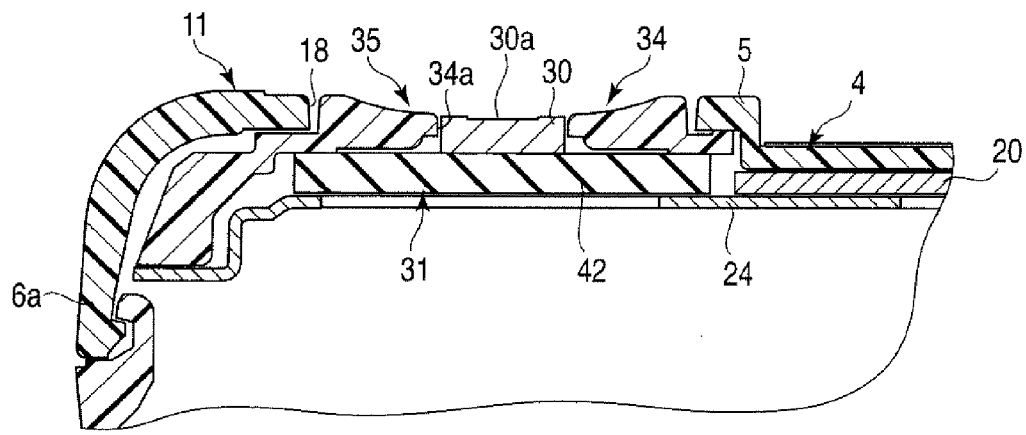
F I G. 18
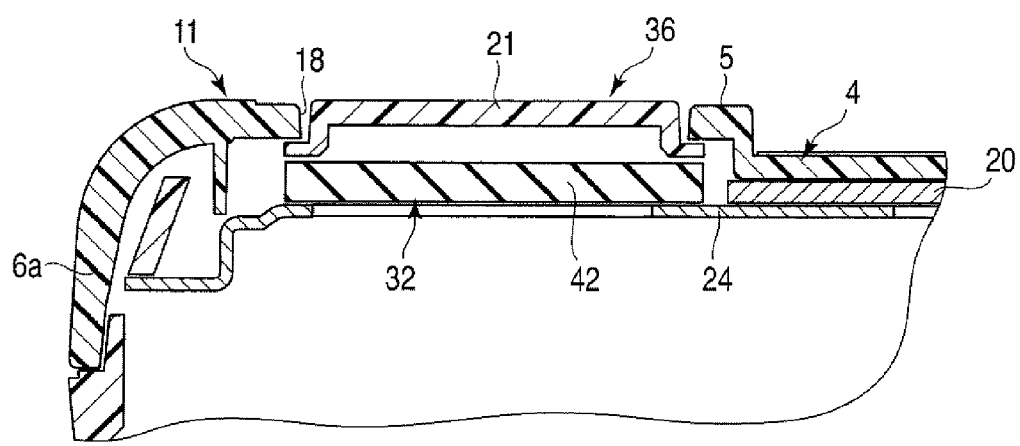
F I G. 19

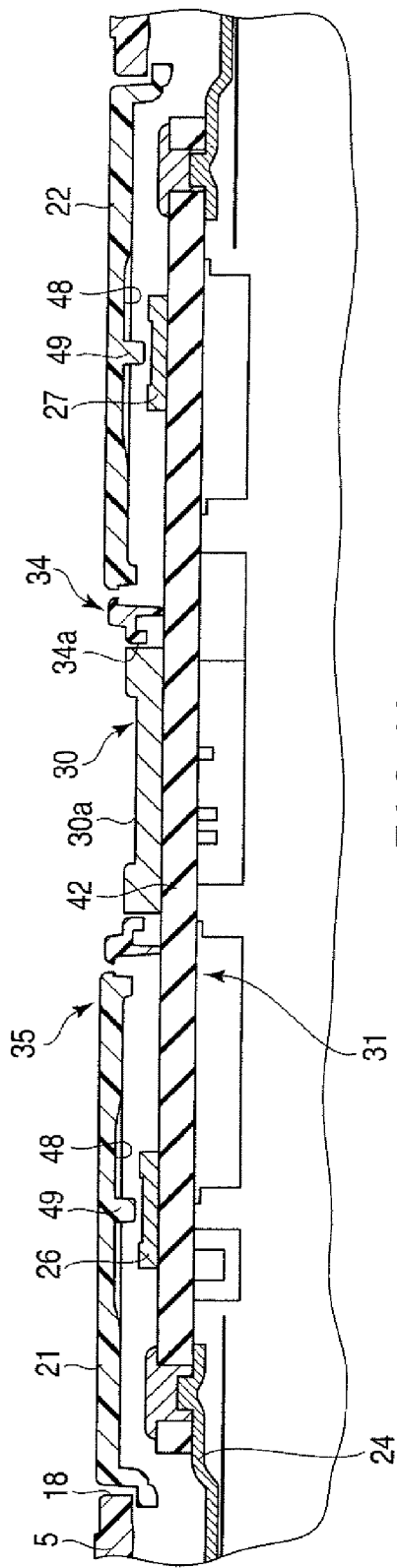
F I G. 20
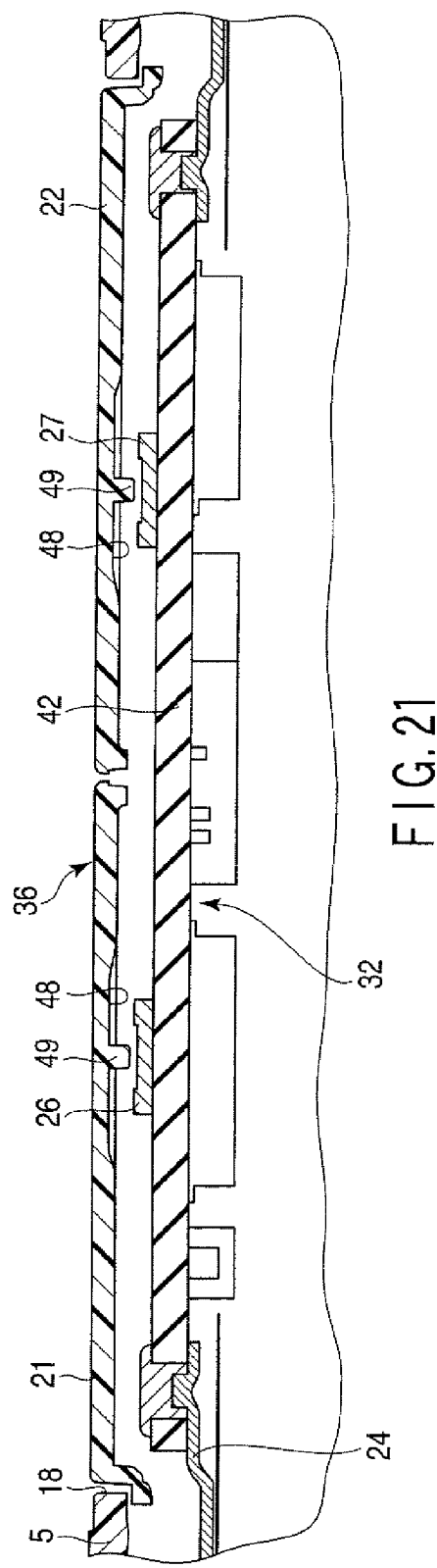
F I G. 21

ELECTRONIC APPARATUS

CROSS-REFERENCE TO RELATED APPLICATIONS

This application is based upon and claims the benefit of priority from Japanese Patent Application No. 2008-148440, filed Jun. 5, 2008, the entire contents of which are incorporated herein by reference.

BACKGROUND

1. Field

One embodiment of the invention relates to an electronic apparatus such as a portable computer.

2. Description of the Related Art

Some electronic apparatuses such as portable computers comprise a fingerprint authentication unit. Such a fingerprint authentication unit is disposed between a pair of touchpad buttons, for example. The fingerprint authentication unit and the touchpad buttons are exposed to the outside of the housing through an opening part of a cover member ("upper cover") forming an upper wall of the housing.

Jpn. Pat. Appln. KOKAI Publication No. 7-263878 discloses an electronic apparatus in which a board bracket and operation buttons are integrally formed. The operation buttons are supported by the board bracket via flexible arms and switch elements can be pressed via the operation buttons.

Recently, users' needs are becoming more and more diverse. Under the circumstances, in the field of electronic apparatuses such as portable computers, one type is sometimes offered in two or more models having different specifications. The present inventors are contemplating offering one type in models with and without a fingerprint authentication unit.

When one type is offered in different models including a model comprising a fingerprint authentication unit and a model not comprising fingerprint authentication unit, different cover members are prepared for the models, since the position in which touchpad buttons are disposed differs according to whether a fingerprint authentication unit is provided or not. Increase in number of kinds of cover members may entail increased manufacturing cost of electronic apparatuses.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 18 is an exemplary cross-sectional view along line F18-F18 of the main unit shown in FIG. 3;

FIG. 19 is an exemplary cross-sectional view along line F19-F19 of the main unit shown in FIG. 4;

FIG. 20 is an exemplary cross-sectional view along line F20-F20 of the main unit shown in FIG. 3;

FIG. 21 is an exemplary cross-sectional view along line F21-F21 of the main unit shown in FIG. 4;

DETAILED DESCRIPTION

Various embodiments according to the invention will be described hereinafter with reference to the accompanying drawings. In general, according to one embodiment of the invention, an electronic apparatus comprises a housing comprising an opening part, a pad button section comprising a pair of buttons disposed in the opening part, and a switch board which is contained in the housing and on which a pair of switches operated via the buttons is mounted. The housing comprises a cover member which forms a part of the housing, the cover member comprising the opening part. One of a first switch board on which a fingerprint authentication unit is mounted between the switches and a second switch board on which no fingerprint authentication units are mounted is selectively adopted as the switch board. One of a first pad button section comprising a fingerprint authentication cover, which exposes the fingerprint authentication unit outside of the housing, between the buttons, and a second pad button section in which the buttons are adjacent to each other is selectively adopted as the pad button section. The cover member is identical in shape between a case where the first pad button section is adopted and a case where the second pad button section is adopted.

Hereinafter, embodiments of the present invention will be described with referenced to the drawings in which the present invention is applied to a portable computer.

First Embodiment

Figure 3:
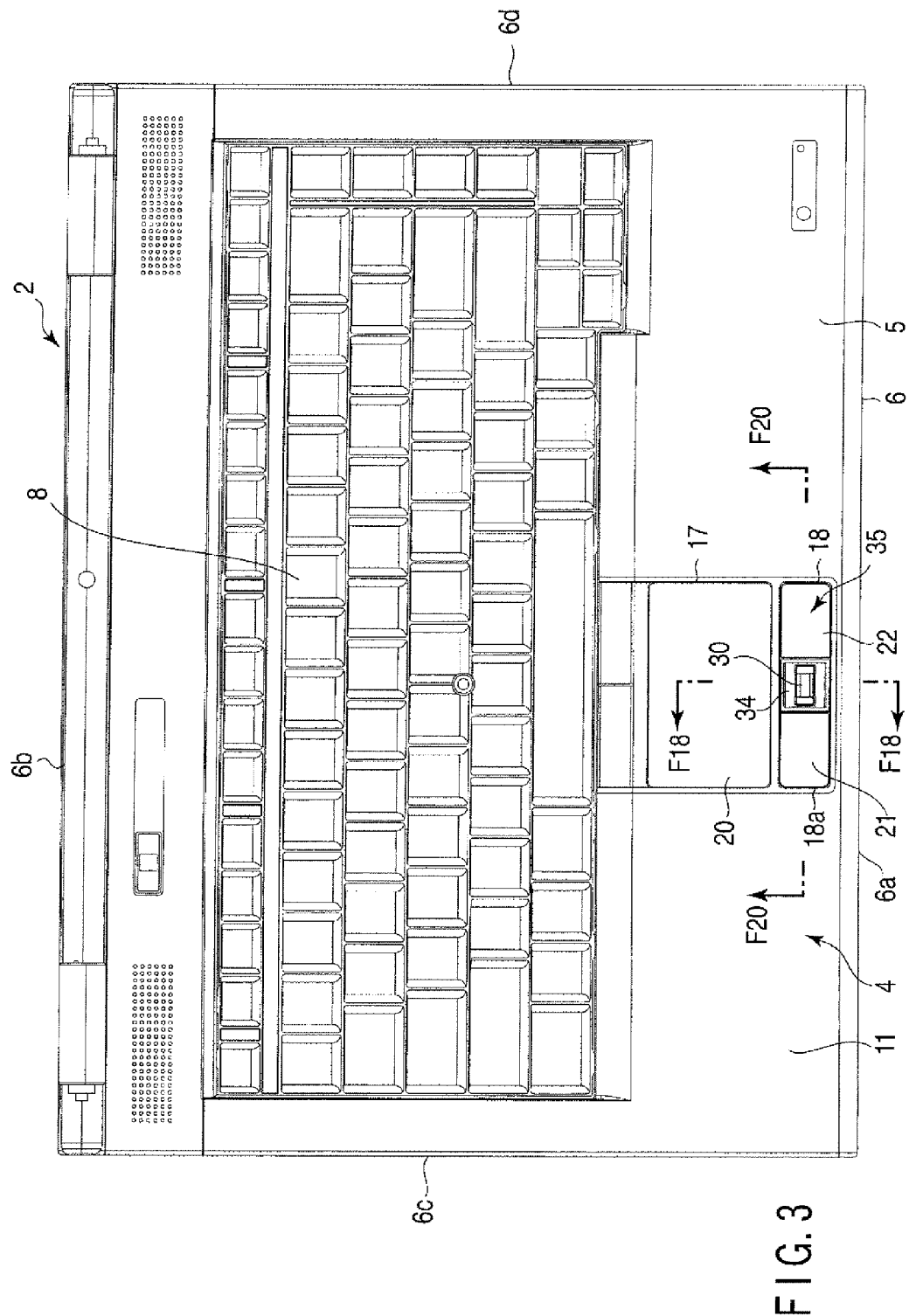
FIG. 3 is an exemplary plan view of a main unit (with a fingerprint authentication function) shown in FIG. 1.
Figure 4:
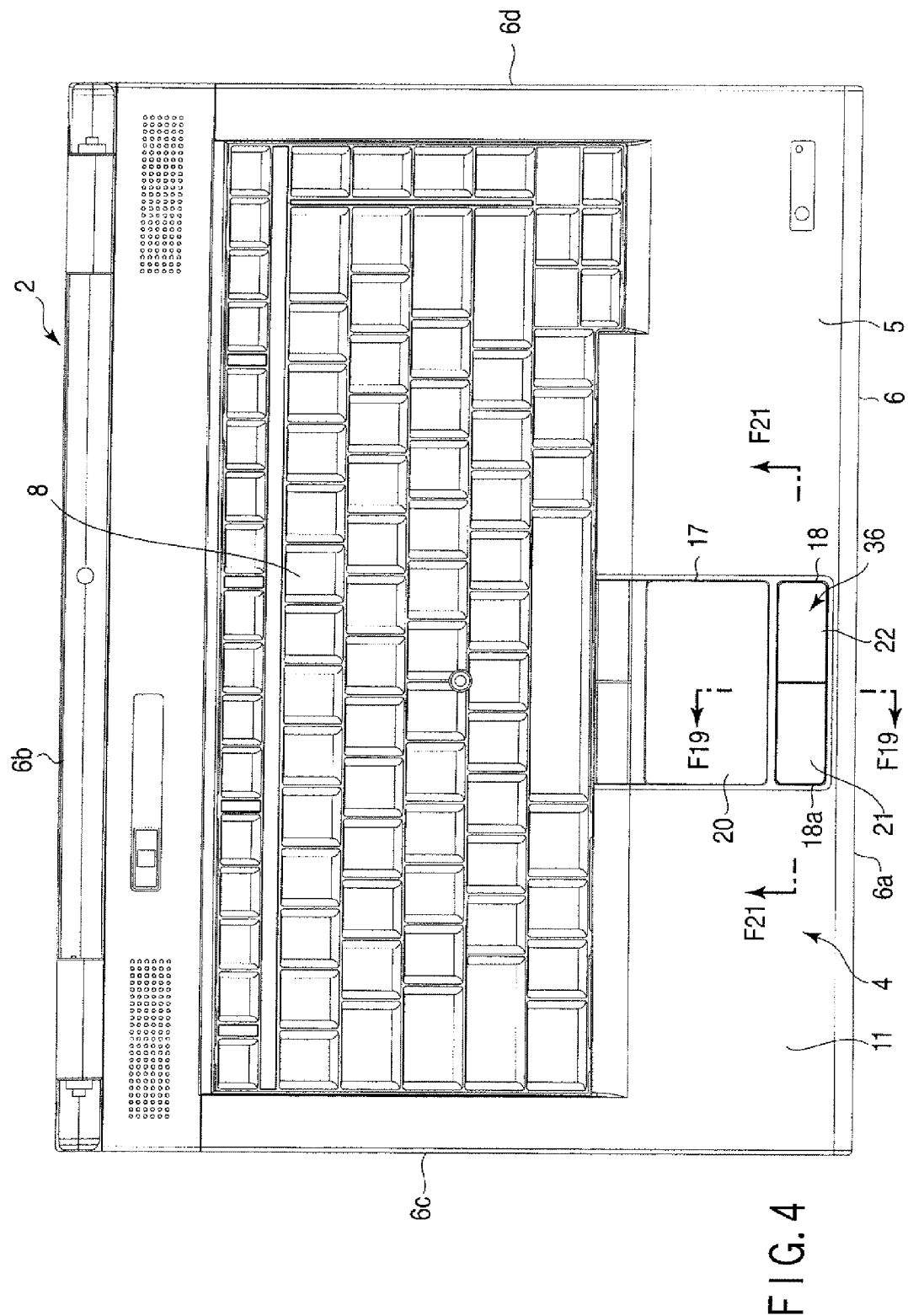
FIG. 4 is an exemplary plan view of a main unit (without a fingerprint authentication function) shown in FIG. 2.

FIGS. 1-21 disclose a portable computer 1 as an electronic apparatus according to a first embodiment of the present invention. For the portable computer 1, one type is offered in a plurality of models with different specifications. More specifically, a first model (i.e., first specification) with a fingerprint authentication function as shown in FIGS. 1 and 3, and a second model (i.e., second specification) without a fingerprint authentication function as shown in FIGS. 2 and 4, are offered.

Figure 1:
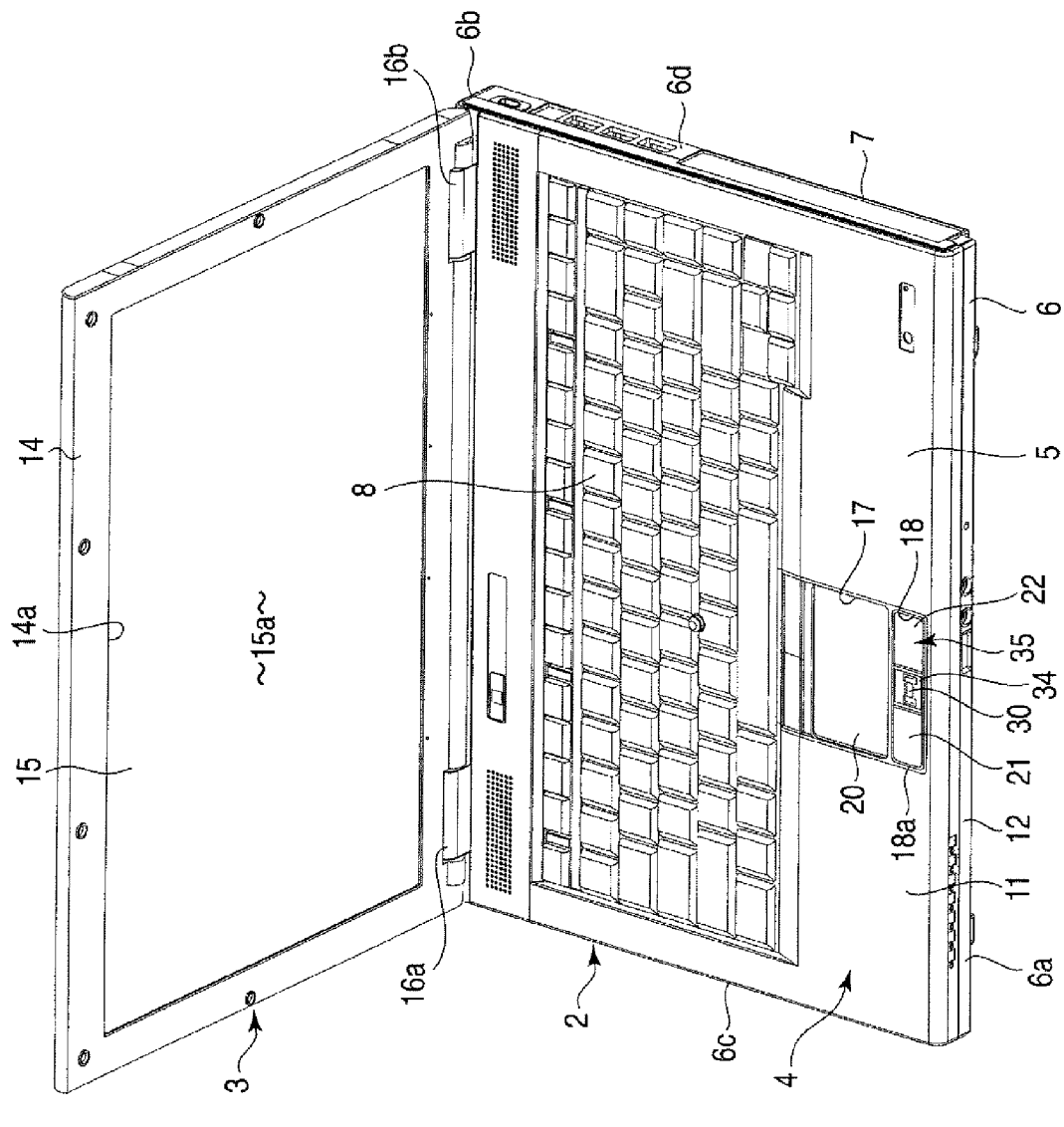
FIG. 1 is an exemplary perspective view of a model with a fingerprint authentication function of a portable computer according to a first embodiment of the present invention.
Figure 2:
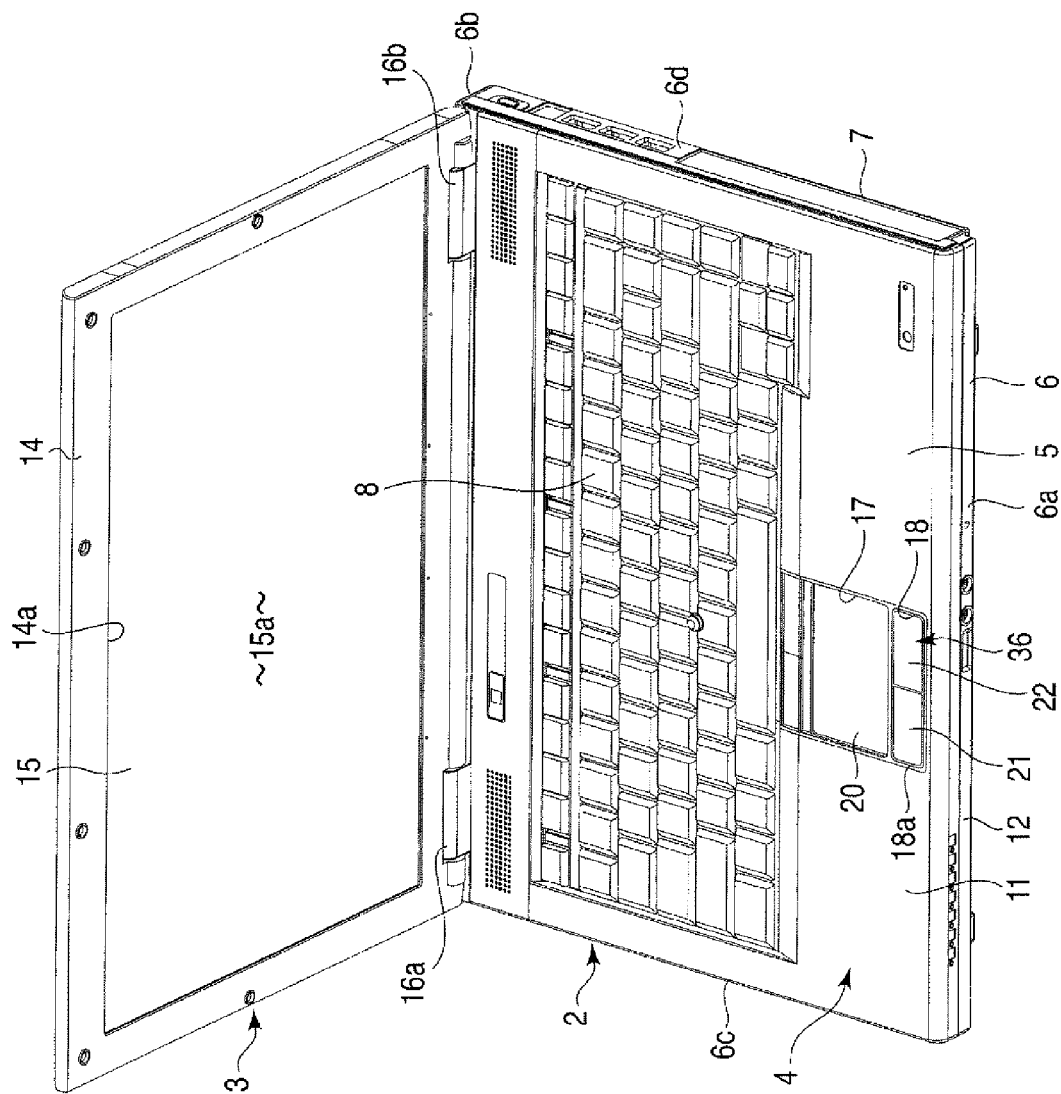
FIG. 2 is an exemplary perspective view of a model without a fingerprint authentication function of a portable computer according to a first embodiment of the present invention.

As shown in FIGS. 1 and 2, the portable computer 1 comprises a main unit 2 and a display unit 3. The main unit 2 comprises a flat box-shaped housing 4. The housing 4 comprises a top wall 5, a peripheral wall 6, and a bottom wall 7. The top wall 5 forms an upper end part of the housing 4 and extends horizontally. The top wall 5 supports a keyboard 8. The peripheral wall 6 extends downward from a peripheral edge part of the top wall 5. The peripheral wall 6 comprises a front wall 6a, a rear wall 6b, and a pair of right and left side walls 6c, 6d. The bottom wall 7 extends in approximately parallel to the top wall 5 to link lower edge parts of the peripheral wall 6 to one other.

The housing 4 comprises a cover member 11 (i.e., upper cover) and a base member 12 (i.e., lower cover). The cover member 11 comprises the top wall 5, a part of the front wall 6a, and a part of the rear wall 6b. The base member 12 comprises the bottom wall 7, and the remaining part of the peripheral wall 6. The cover member 11 is combined with the base member 12 from above, thereby forming the housing 4. That is, the cover member 11 forms a part of the housing 4. An inner space containing a circuit board, for example, is formed between the cover member 11 and the base member 12.

As shown in FIGS. 1 and 2, the display unit 3 comprises a display housing 14 and a display device 15 contained in the display housing 14. An example of the display device 15 is a liquid crystal display. The display device 15 comprises a display screen 15a. The display screen 15a is exposed to the outside via an opening part 14a provided on a front wall of the display housing 14.

A pair of hinges 16a, 16b, for example, is provided in a rear edge part of the main unit 2. The hinges 16a, 16b swingably couples the display part 3 to the main unit 2. The display part 3 is thereby swingable between a first position in which the display part 3 is bent to cover the top wall 5 of the main unit 2 and a second position in which the display part 3 is raised from the top wall 5.

As shown in FIGS. 1-4, the top wall 5 comprises first and second opening parts 17, 18 in front of the keyboard 8. The first opening part 17 exposes a touchpad 20. The second opening part 18 (hereinafter referred to as the "opening part 18") is an example of the opening part of the present invention, and exposes a pair of buttons (i.e., touchpad buttons) 21, 22.

Figure 5:
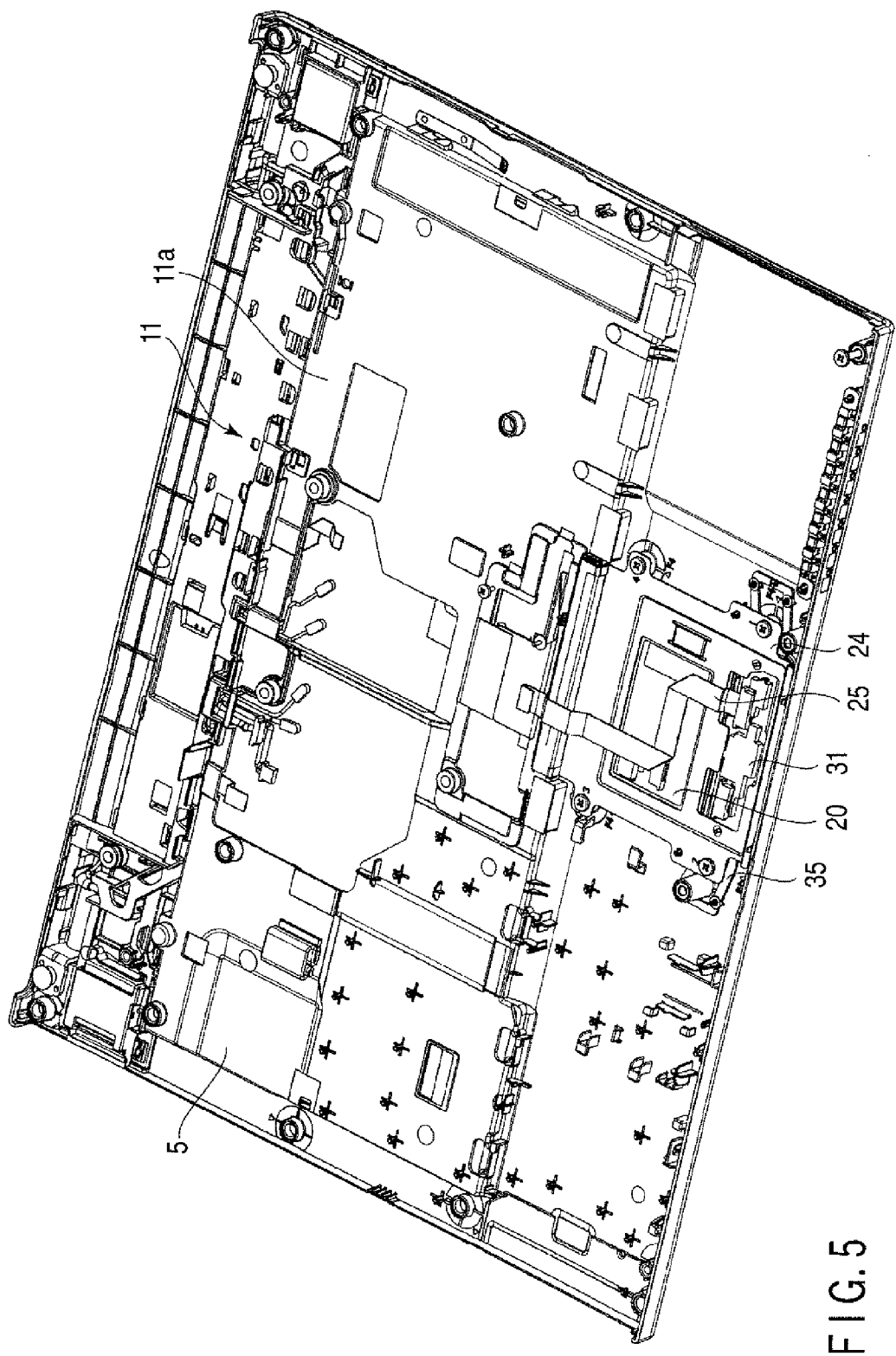
FIG. 5 is an exemplary perspective view of a cover member viewed from an inner surface side according to the first embodiment of the present invention.
Figure 6:
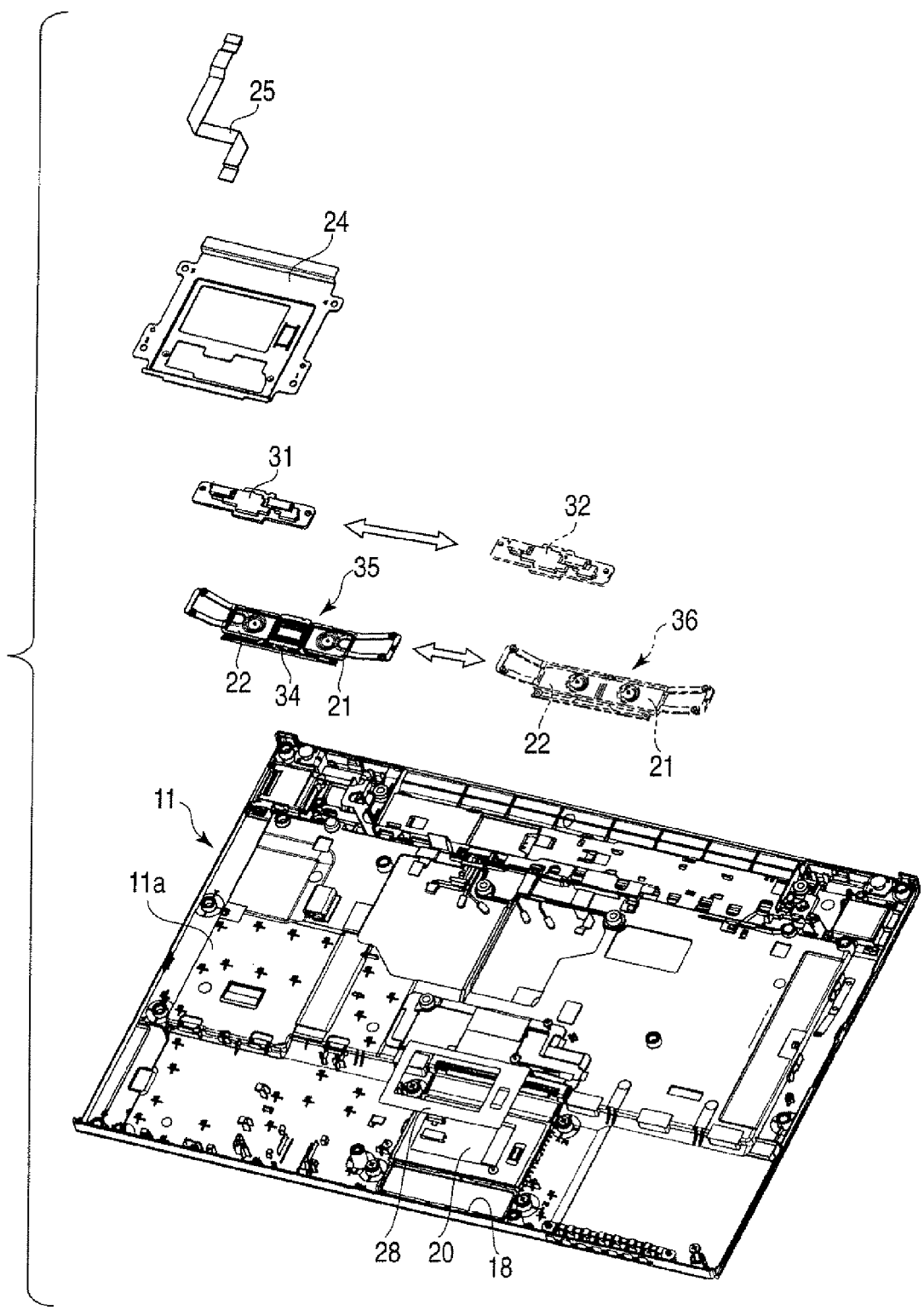
FIG. 6 is an exemplary perspective view of structural elements around a pad button section of the portable computer in a partially-exploded manner according to the first embodiment of the present invention.

FIG. 5 shows a state in which structural elements around the opening part 18 are mounted, when viewed from the back of the cover member 11 (i.e., from an inner surface side of the housing 4). FIG. 6 shows a partially exploded view of the structural elements shown in FIG. 5. As shown in FIG. 6, the portable computer 1 comprises a pad button section, a switch board, a fixing member 24, and a cable 25.

The pad button section comprises a pair of buttons 21, 22 disposed in the opening part 18. The switch board is contained in the housing 4 and comprises a pair of switches 26, 27 mounted thereon and operated via the buttons 21, 22 of the pad button section (see FIGS. 8 and 9). The switches 26, 27 are tact switches, or dome switches, for example. The fixing member 24 fixes the switch board in the housing 4. An insulator film 28, for example, is attached between the fixing member 24 and the touch pad 20.

Figure 8:
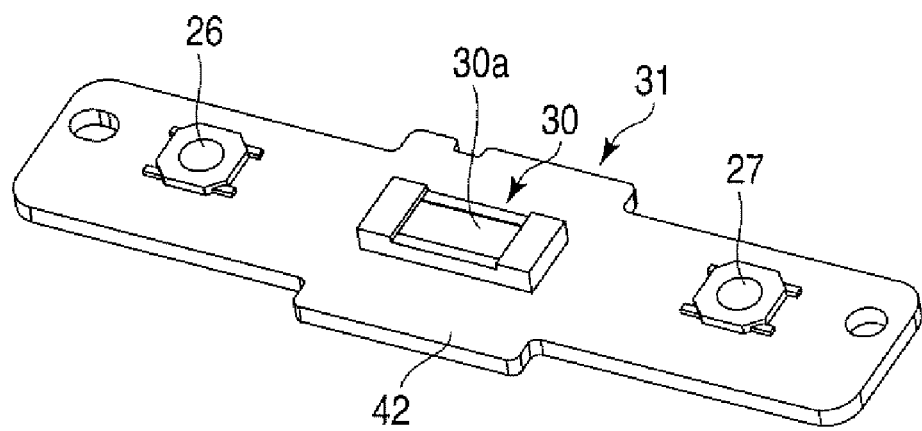
FIG. 8 is an exemplary perspective view of a first switch board according to the first embodiment of the present invention.
Figure 9:
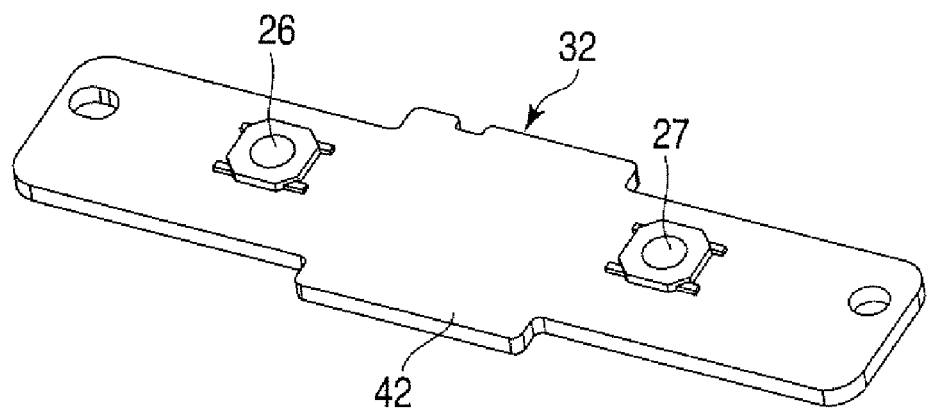
FIG. 9 is an exemplary perspective view of a second switch board according to the first embodiment of the present invention.

As shown in FIGS. 6, 8 and 9, as the switch board, one of a first switch board 31 on which a fingerprint authentication unit 30 is mounted between the switches 26, 27 and a second switch board 32 on which no fingerprint authentication units are mounted (i.e., a fingerprint authentication unit 30 is not mounted) is selectively adopted. As the pad button section, one of a first pad button section 35 in which a fingerprint authentication cover 34 is provided between the buttons 21, 22 and a second pad button section 36 in which the buttons 21, 22 are adjacent to each other (i.e., the fingerprint authentication cover 34 is not provided) is selectively adopted.

In the present embodiment, in the case where a first model with a fingerprint authentication function is offered, the first switch board 31 and the first pad button section 35 are adopted. On the other hand, in the case where the second model without a fingerprint authentication function is offered, the second switch board 32 and the second pad button section 36 are adopted. The cover member 11 of the housing 4, the fixing member 24, and the cable 25 are identical in shape (i.e., the same kind) between the first model with a fingerprint authentication function and the second model without a fingerprint authentication function (i.e., between the case where the first pad button section 35 is adopted and the case where the second pad button section 36 is adopted).

Next, structural elements will be described in detail. Structural elements having the same or similar function will be denoted by the same reference symbol and descriptions of such elements will be omitted herein.

Figure 7:
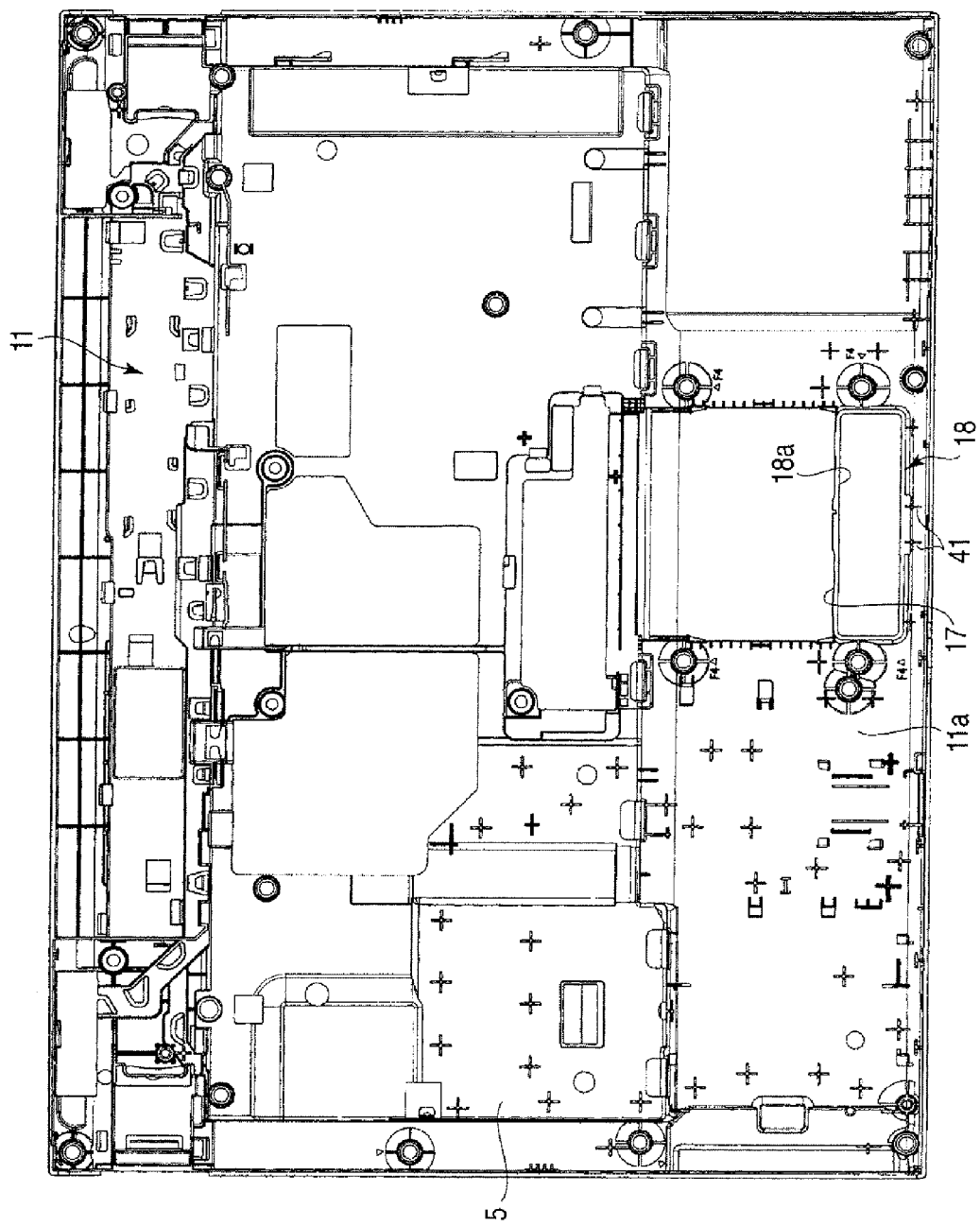
FIG. 7 is an exemplary plan view of the inner surface of the cover member according to the first embodiment of the present invention.

FIG. 7 shows an inner surface 11a (i.e., the surface facing the inside of the housing 4) of the cover member 11. As shown in FIG. 4, the first and second opening parts 17, 18 are provided in the cover member 11. The second opening part 18 is formed in a rectangular shape extending laterally relative to the housing 4.

Figure 16:
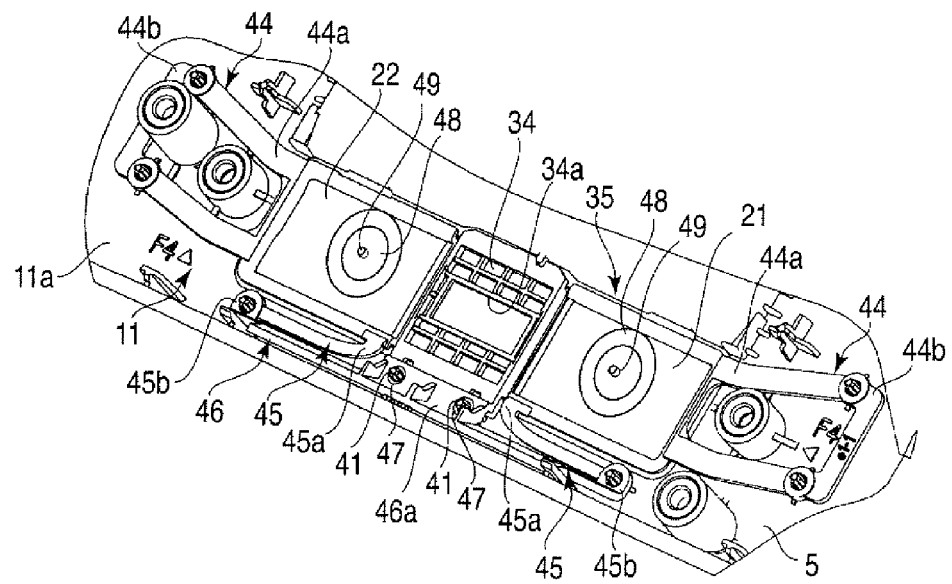
FIG. 16 is an exemplary perspective view of the cover member to which the first pad button section according to the first embodiment of the present invention is attached.
Figure 17:
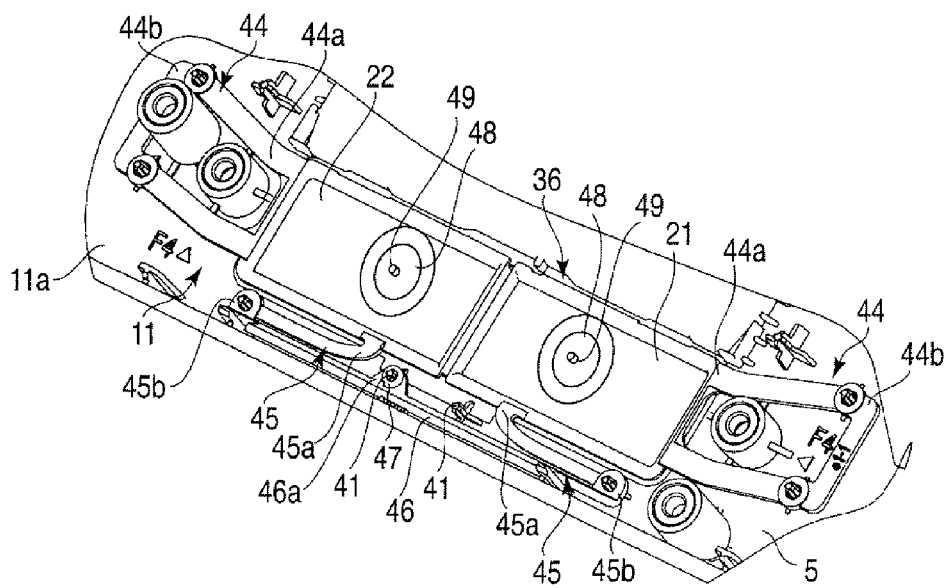
FIG. 17 is an exemplary perspective view of the cover member to which the second pad button section according to the first embodiment of the present invention is attached.

As shown in FIGS. 7, 16 and 17, the inner surface 11a of the cover member 11 comprises first engaging parts 41 for positioning in a peripheral part of the opening part 18, for example. The first engaging part 41 is a projection in the housing 4, for example. The number of the first engaging parts 41 is not limited to a specific number, and may be one, or two or more.

FIG. 8 shows a first switch board 31. The first switch board 31 comprises a circuit board 42, the pair of switches 26, 27 and the fingerprint authentication unit 30. The circuit board 42 is formed in a rectangular shape extending laterally relative to the housing 4. The pair of switches 26, 27 is separately mounted on a left region and a right region of the circuit board 42, respectively. The fingerprint authentication unit 30 is mounted on a central part of the circuit board 42, i.e., between the pair of switches 26, 27. A top surface of the fingerprint authentication unit 30 comprises a sensor surface 30a which reads fingerprints of users.

FIG. 9 shows a second switch board 32. The second switch board 32 comprises a circuit board 42 and the pair of switches 26, 27. The fingerprint authentication unit 30 is not mounted on the second switch board 32 between the pair of switches 26, 27. The circuit board 42 of the second switch board 32 has the same outer shape as that of the circuit board 42 of the first switch board 31. The switches 26, 27 are separately mounted on a left region and a right region of the circuit board 42, respectively. The pair of switches 26, 27 is disposed nearer a central part of the circuit board 42, as compared to the switches 26, 27 of the first switch board 42.

Next, the first pad button section 35 will be described below.

Figure 10:
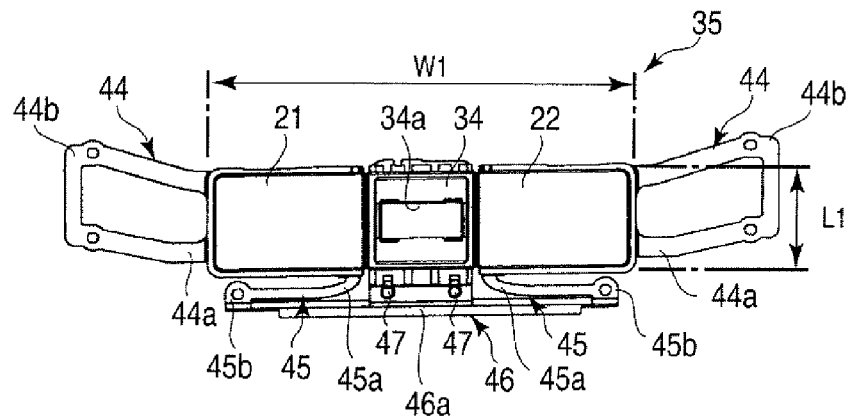
FIG. 10 is an exemplary plan view of a first pad button section according to the first embodiment of the present invention.
Figure 11:
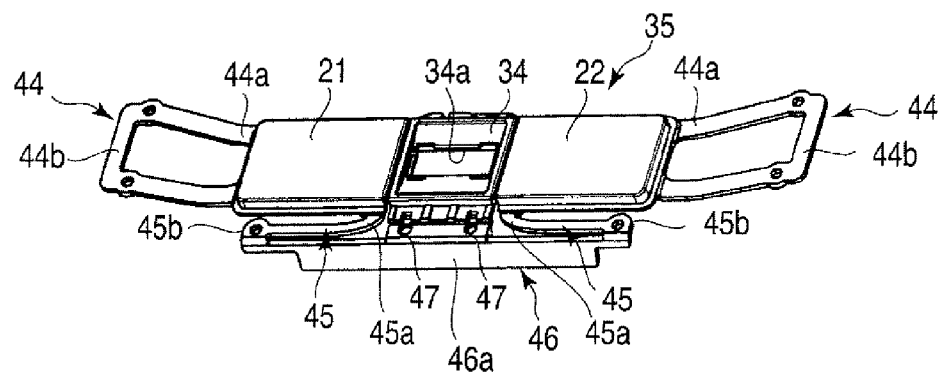
FIG. 11 is an exemplary perspective view of the first pad button section according to the first embodiment of the present invention.
Figure 12:
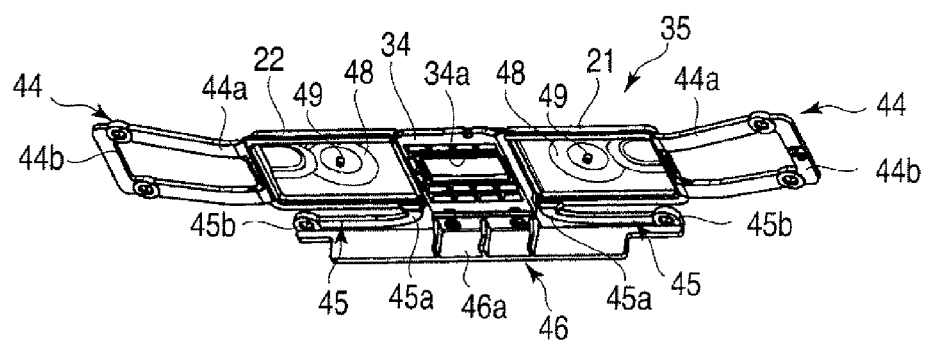
FIG. 12 is an exemplary perspective view of the first pad button section according to the first embodiment of the present invention.

FIGS. 10-12 show the first pad button section 35. The first pad button section 35 comprises the pair of buttons 21, 22, first and second arms 44, 45, a coupling part 46, and the fingerprint authentication cover 34. The fingerprint authentication cover 34 is provided between the buttons 21, 22. The fingerprint authentication cover 34 comprises an opening part 34a which exposes the fingerprint authentication unit 30 to the outside of the housing 4.

The buttons 21, 22 are separately provided on both sides of the fingerprint authentication cover 34 to be opposed to the switches 26, 27 of the switch board. The pair of buttons 21, 22 forms an outer shape of the first pad button section 35, which shape corresponding to an inner rim 18a of the opening part 18 of the housing 4. That is, the shape (i.e., the length and the width) of the pair of buttons 21, 22 is set such that the outer shape of the first pad button section 35 suits the shape of the opening part 18 of the housing 4.

The first arm 44 has flexibility and extends laterally from the buttons 21, 22. The first arm 44 comprises a first end portion 44a which is linked to the buttons 21, 22 and a second end portion 44b which is welded and fixed on the top wall 5 of the housing 4 (see FIG. 16). The second arm 45 has flexibility and extends between the coupling part 46 and the buttons 21, 22. The second arm 45 comprises a first end portion 45a which is linked to a corresponding to one of the buttons 21, 22 and a second end portion 45b linked to the coupling part 46 and welded and fixed on the top wall 5 of the housing 4 (see FIG. 16).

The coupling part 46 extends laterally relative to the housing 4, and links the second end parts 45b of the second arms 45 extending from the buttons 21, 22. A central part 46a of the coupling part 46 is linked to the fingerprint authentication cover portion 34, and supports the fingerprint authentication cover 34. The pair of buttons 21, 22, the first and second arms 44, 45, the coupling part 46, and the fingerprint authentication cover 34 are integrally formed. That is, the fingerprint authentication cover 34 and the buttons 21, 22 are integrated.

second engaging parts 47 are provided in a central part of the coupling part 46. The second engaging part 47 is configured to engage with the first engaging part 41 of the cover member 11. The second engaging part 47 is an engaging hole in which the first engaging part 41, for example, is engaged. When the first engaging part 41 is engaged with the second engaging part 47, positioning of the pair of buttons 21, 22 of the first pad button section 35 and the fingerprint authentication cover 34 is performed. That is, the pair of buttons 21, 22 and the fingerprint authentication cover part 34 share the engaging part 47 for positioning.

As shown in FIGS. 12 and 20, each of the buttons 21, 22 comprises a concave portion (i.e., counter boring) 48 on a surface (i.e., the bottom surface) opposed to the switch board. As shown in FIG. 20, the concave portion 48 is provided in a region opposed to a corresponding one of the switches 26, 27 and recessed in a direction away from the switches 26, 27. A contact projection 49 is provided on the bottom surface of the concave portion 48. The contact projection 49 projects from the concave portion 49 toward the corresponding one of the switches 26, 27. The contact projection 49 contacts the switches 26, 27 when the buttons 21, 22 are pressed and operates the switches 26, 27.

Next, the second pad button section 36 will be described below.

FIGS. 13-16 show the second pad button section 36. The second pad button section 36 comprises a pair of buttons 21, 22, a first and second arms 44, 45, and a coupling part 46. The second pad button section 36 is not provided with a fingerprint authentication cover part 34 between the pair of buttons 21, 22.

The buttons 21, 22 of the second pad button section 36 are greater in size than the buttons 21, 22 of the first pad button section 35. The two buttons 21, 22 of the second pad button section 36 are adjacent to each other and opposed to the switches 26, 27 of the switch board. The pair of buttons 21, 22 forms an outer shape of the second pad button section 36, which shape corresponds to the inner rim 18a of the opening part 18 of the housing 4. That is, the shape (i.e., length and width) of the pair of buttons 21, 22 is set to suit the shape of the opening part 18 of the housing 4.

That is, a width W2 of the second pad button section 36 is the same as a width W1 of the first pad button section. A length L2 of the second pad button section 36 is the same as a length L1 of the first pad button section 35. In other words, the total size of the pair of buttons 21, 22 of the first pad button section 36 is set to be the same as the total size of the pair of buttons 21, 22 of the first pad button section 35 and the fingerprint authentication cover part 34.

Figure 13:
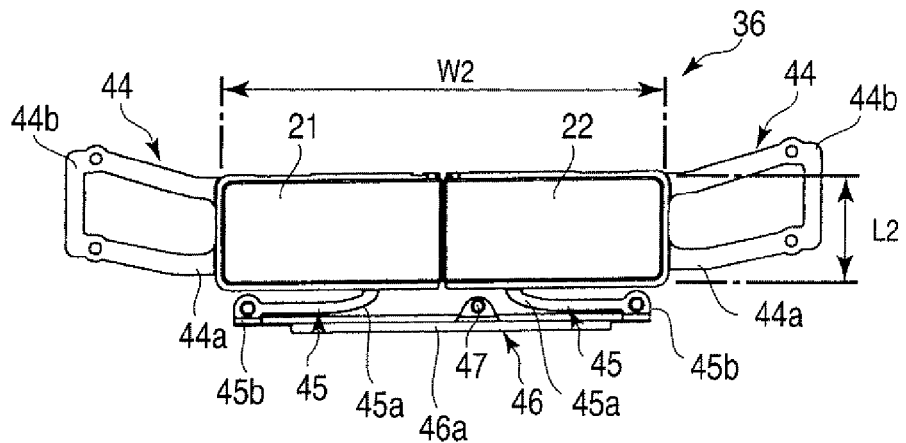
FIG. 13 is an exemplary plan view of the second pad button section according to the first embodiment of the present invention.
Figure 14:
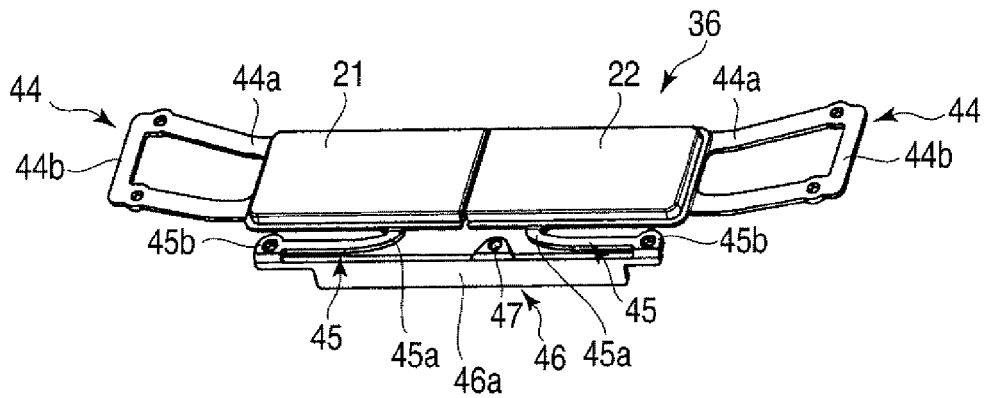
FIG. 14 is an exemplary perspective view of the second pad button section according to the first embodiment of the present invention.
Figure 15:
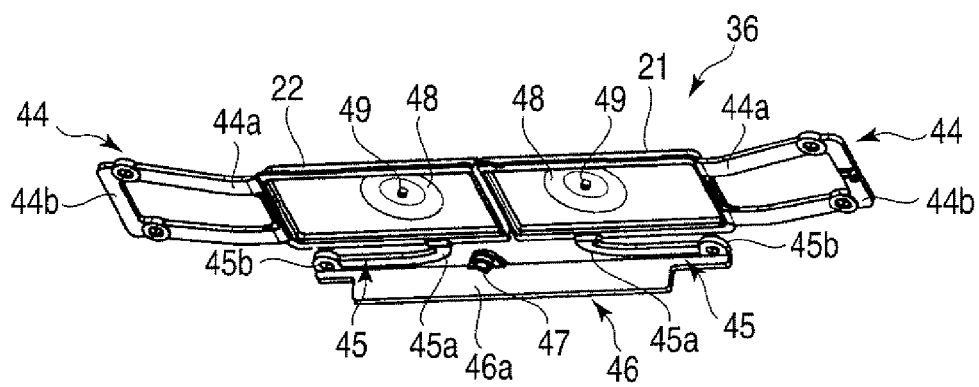
FIG. 15 is an exemplary perspective view of the second pad button section according to the first embodiment of the present invention.

As shown in FIGS. 13-15, the pair of buttons 21, 22, the first and second arms 44, 45, and the coupling part 46 are integrally formed in the second pad button section 36. Further, the second engaging part 47 is provided in a central part of the coupling part 46. The second engaging part 47 of the second pad button is configured to engage with the first engaging part 41 of the cover member 11. The second engaging part 47 is an engaging hole, in which the first engaging part 41 is engaged, for example. When the first engaging part 41 is engaged with the second engaging part 47, positioning of the pair of buttons 21, 22 of the second pad button section 36 is performed.

In other words, the second pad button section 36 comprises a second engaging part 47 which engage with the first engaging part 41 of the cover member 11 used for positioning of the first pad button section 35, and performs positioning of the second pad button section 36. That is, the first and second pad button sections 35, 36 share the first engaging part 41 of the cover member 11 as an engaging part for positioning.

As shown in FIGS. 15 and 21, each of the buttons 21, 22 comprises a concave portion 48 on a surface (i.e., a bottom surface) opposed to a corresponding to one of the switches 26, 27 of the switch board. As shown in FIG. 21, the concave portion 48 is provided in a region opposed to the corresponding to one of the switches 26, 27 and recessed in a direction away from the corresponding one of the switches 26, 27. A contact projection 49 is provided on a bottom surface of the concave portion 48. The contact projection 49 projects toward the corresponding to one of the switches 26, 27 from the concave portion 48. The contact projection 49 contacts the switches 26, 27 when the buttons 21, 22 are pressed and operates the switches 26, 27.

As shown in FIGS. 5, 6, 18 and 19, the fixing member 24 is contained in the housing 4. The fixing member 24 is a sheet-metal member, for example. The fixing member 24 is fixed to the housing 4 by means of a joint member such as a screw. The fixing member 24 is positioned below the touchpad 20 and the switch board and supports the touch pad 20 and the switch board. The cable 25 is a flexible flat cable (FFC), for example, and is connected to the switch board, as shown in FIG. 5.

Next, the operation of the portable computer 1 will be described.

In the present embodiment, in the case where a first model with a fingerprint authentication function is offered, a first switch board 31, a first pad button section 35, and a fixing member 24, for example, are mounted to the cover member 11. As shown in FIGS. 18 and 20, the fingerprint authentication unit 30 mounted on the first switch board 31 is exposed to the outside of the housing 4 through the opening part 34a of the fingerprint authentication cover 34 of the first pad button section 35. A user can use the fingerprint authentication function by moving his or her finger on the fingerprint authentication unit 30.

In the case where a second model without a fingerprint authentication function is offered, on the other hand, a second switch board 32, a second pad button section 36, and a fixing member 24, for example, are mounted to the cover member 11. For the cover member 11 and the fixing member 24, the same shapes (i.e., the same kinds) as those used for the first model are adopted. In the second model, the opening part 18 is thoroughly covered by the buttons 21, 22, as shown in FIGS. 19 and 21.

According to the portable computer 1 with the above-described configuration, when a plurality of models with different specifications are offered, increase in number of kinds of cover members 11 can be suppressed. That is, in the portable computer 1 according to the present embodiment, one of a first switch board 31 on which a fingerprint authentication unit 30 is mounted and a second switch board 32 on which a fingerprint authentication unit 30 is not mounted is selectively adopted. Further, one of a first pad button section 35 in which a fingerprint authentication cover 34 is provided and a second pad button section 36 in which a fingerprint authentication cover 34 is not provided is selectively adopted. As for the cover member 11 and the fixing member 24, the same shapes are adopted regardless of whether the fingerprint authentication function is provided or not.

Thereby, switching between a model with the fingerprint authentication function and a model without the fingerprint authentication function can be made by selection of the switch board and the pad button section. That is, switching between models with and without the fingerprint authentication function can be dealt with out increasing the number of kinds of the cover member 11. The cover member 11 is a relatively large member in the structural elements of the portable computer 1. By preventing the number of kinds of the cover member 11 from increasing, the manufacturing cost of the portable computer 1 can be decreased, and the parts inventory of the cover members 11 can be reduced.

Selectively adopting the switch board from the first and second switch boards 31, 32 eliminates the necessity to install the first switch board 31 on which a relatively expensive fingerprint authentication unit is installed in the portable computer 1 not provided with a fingerprint authentication function. Thereby, the manufacturing cost of the portable computer 1 can be decreased.

By integrally forming the pair of buttons 21, 22 of the first pad button section 35 and the fingerprint authentication cover 34, the number of members which differ according to whether the fingerprint authentication function is provided or not is decreased. Thereby, switching between with and without the fingerprint authentication function can be performed more effectively.

Further, in the case where the pair of buttons 21, 22 of the first pad button section 35 and the fingerprint authentication cover 34 are integrally formed, the buttons 21, 22 and the fingerprint authentication cover 34 are easily kept at a predetermined interval (i.e., at an even interval). That is, variation in interval between the buttons 21, 22 and the fingerprint authentication cover 34 can be made small between products. Further, the interval between the buttons 21, 22 and the fingerprint authentication cover 34 can be easily maintained at a predetermined degree in one product. In the case where a predetermined interval between the buttons 21, 22 and the fingerprint authentication cover 34 is maintained, the portable computer 1 will have improved appearance quality.

In the case where the engaging part 41 for positioning is provided on the inner surface 11a of the cover member 11 and the first pad button section 35 comprises an engaging part 47 which engages the engaging part 41 of the cover member 11 and performs positioning of the buttons 21, 22 and the fingerprint authentication cover 34, the buttons 21, 22 and the fingerprint authentication cover 23 can be positioned simultaneously only by means of the engaging part 47.

In the case where the second pad 36 comprises the engaging part 47 which engages the engaging part 41 of the cover member 11 used for positioning of the first pad button section 35 and performs positioning of the second pad button section 36, the pad button section can be positioned regardless of whether the fingerprint authentication function is provided or not.

In the portable computer 1 in which the fingerprint authentication unit 30 is installed, the sensor surface 30a is disposed in a position relatively close to an exterior part of the housing 4, such that a user can easily place his or her finger on the sensor surface 30a of the fingerprint authentication unit 30. The switch board 31 according to the present embodiment is therefore disposed in a relatively high position (i.e., in a position close to the top wall 5) in the housing 4. This makes the distance between a distal end of the contact projection 49 provided on a bottom surface of each of the buttons 21, 22 and an upper surface of each of the switches 26, 27 relatively small. In such a case, a sufficient stroke of the buttons 21, 22 cannot be easily secured.

However, in the portable computer 1 according to the present embodiment, each of the buttons 21, 22 comprises the concave portion 48 in a part in which the contact projection 49 is provided, and thereby a relatively sufficient distance between the distal end of the contact projection 49 and the top surface of each of the switches 26, 27 can be secured. Thereby, a relatively large stroke of the buttons 21, 22 can be secured, and the operability of the buttons 21, 22 increases.

According to the present embodiment, regardless of whether the fingerprint authentication function is provided or not, the fixing member 24 is commonly used. Therefore, the second switch board 32, on which the fingerprint authentication unit 30 is not mounted, is disposed at the same height as that of the first switch board 31, and disposed at a relatively high position (i.e., the position close to the top wall 5) in the housing 4.

In the portable computer 1 according to the present embodiment, each of the buttons 21, 22 of the second pad button section 36 comprises the concave portion 48 in a part in which the contact projection 49 is provided. Thereby, a relatively sufficient distance between a distal end of the contact projection 49 and the top wall of each of the switches 26, 27 can be secured in the second pad button section 36, too. This improves operability of the buttons 21, 22. That is, in the portable computer which switches between a model with a fingerprint authentication function and a model without a fingerprint authentication function, good operability of the buttons 21, 22 can be secured in both of the models by selection of the switch board and the pad button section.

Second Embodiment

Next, a portable computer 1 as an electronic apparatus according to the second embodiment of the present invention will be described with reference to FIGS. 22-25. Structural elements having functions same as or similar to those of the first embodiment will be denoted by the same reference symbols and descriptions of such elements will be omitted herein.

Figure 22:
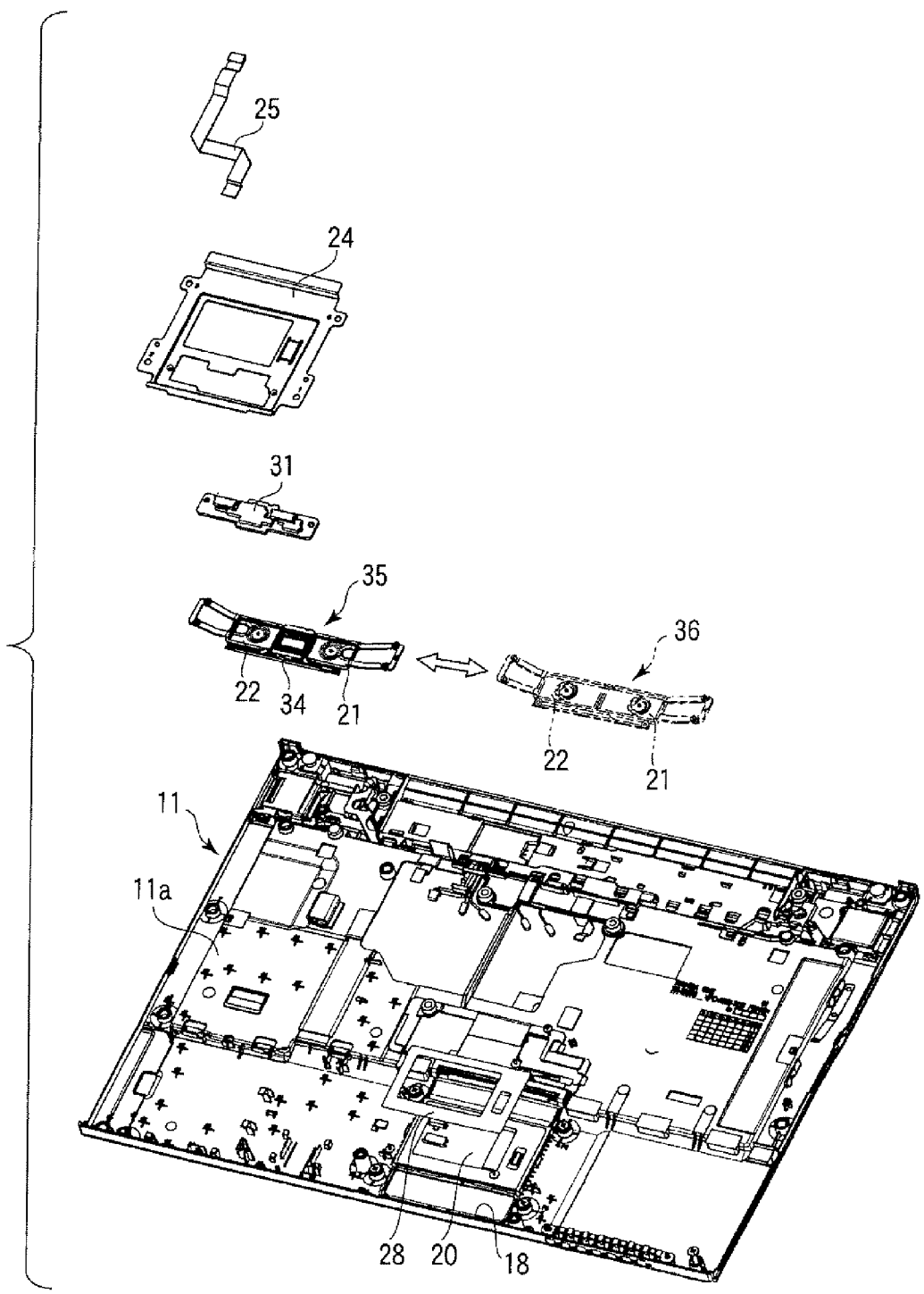
FIG. 22 is an exemplary perspective view of structural elements around a pad button section of a portable computer in a partially-exploded manner according to a second embodiment of the present invention.

FIG. 22 shows a partially exploded view of structural elements around an opening part 18 of the portable computer 1 according to the second embodiment. The portable computer 1 according to the second embodiment comprises a pad button section, a switch board 31, a fixing member 24, and a cable 25. The pad button section comprises a pair of buttons 21, 22 disposed in an opening part 18. The switch board 31 is contained in the housing 4 and comprises a pair of switches 26, 27 mounted thereon and operated via the buttons 21, 22 of the pad button section.

A fingerprint authentication unit 30 is mounted on the switch board 31 between the switches 26, 27. That is, the switch board 31 according to the second embodiment is the same as the first switch board 31 according to the first embodiment. In the portable computer 1 according to the present embodiment, the switch board 31 of the same kind is adopted both in a first model with a fingerprint authentication function and in a second model without a fingerprint authentication function.

As the pad button section, one of the first pad button section 35 in which a fingerprint authentication cover 34 is provided between the buttons 21, 22, and a second pad button section in which the buttons 21, 22 are adjacent to each other (i.e., the fingerprint authentication cover 34 is not provided) is selectively adopted. The first pad button section 35 of the second embodiment is the same as the first pad button section 35 of the first embodiment.

The basic configuration of the second pad button section 36 according to the present embodiment is the same as that of the second pad button section 36 according to the first embodiment. The second pad button section 36 according to the present embodiment comprises the pair of buttons 21, 22, first and second arms 44, 45, and a coupling part 46. The second pad button section 36 is not provided with the fingerprint authentication cover 34 between the buttons 21, 22.

Figure 23:
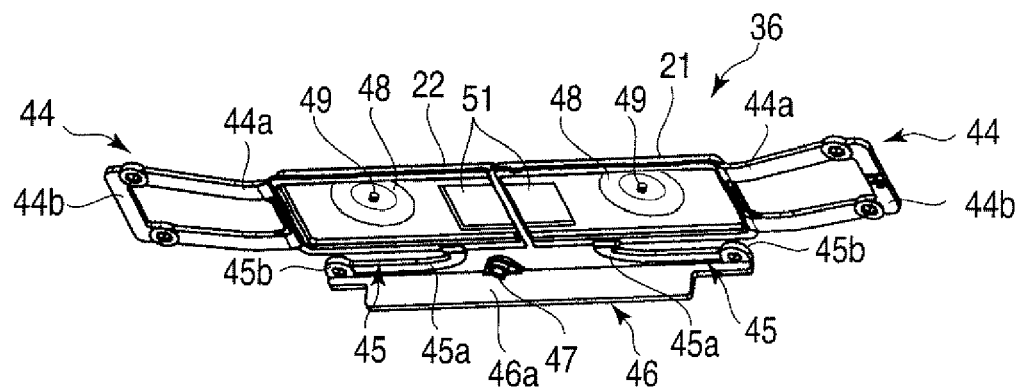
FIG. 23 is an exemplary perspective view of a second pad button section according to the second embodiment of the present invention.

As shown in FIG. 23, concave portions 48 and contact projections 49 of the second pad button section 36 according to the present embodiment are provided nearer to a peripheral edge part of the second pad button section 36, as compared to the first embodiment, to be opposed to the switches 26, 27 of the switch board 31.

In the present embodiment, in the case where a first model with a fingerprint authentication function is offered, the first pad button section 35 is adopted. In the case where a second model without a fingerprint authentication function is offered, on the other hand, the second pad button section 36 is adopted. The cover member 11, the switch board 31, the fixing member 24, and the cable 25 are identical in shape (i.e., the same kind) between the first model with the fingerprint authentication function and the second model without the fingerprint authentication function (i.e., between the case where the first pad button section 35 is adopted and the case where the second pad button section 36 is adopted).

In other words, the second model according to the present embodiment is a model which adopts the first switch board 31 and the second pad button section 36 in the first embodiment.

Figure 24:
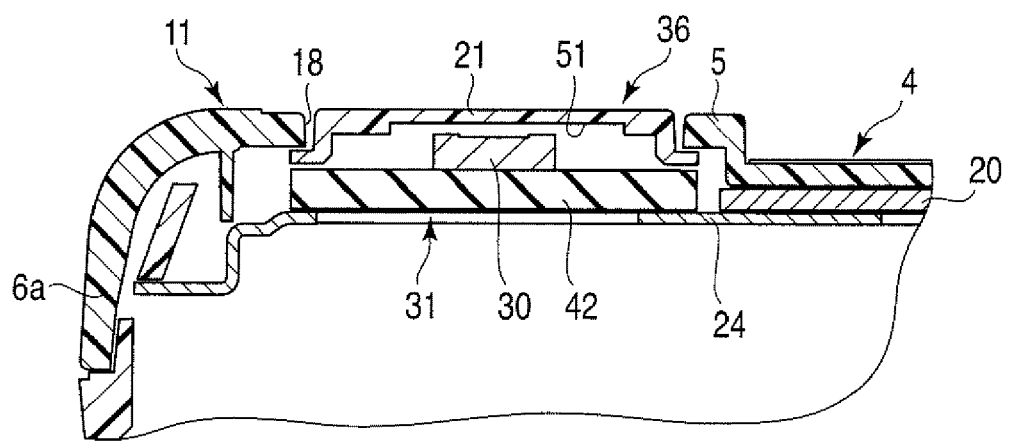
FIG. 24 is an exemplary cross-sectional view of a main unit according to the second embodiment of the present invention.
Figure 25:
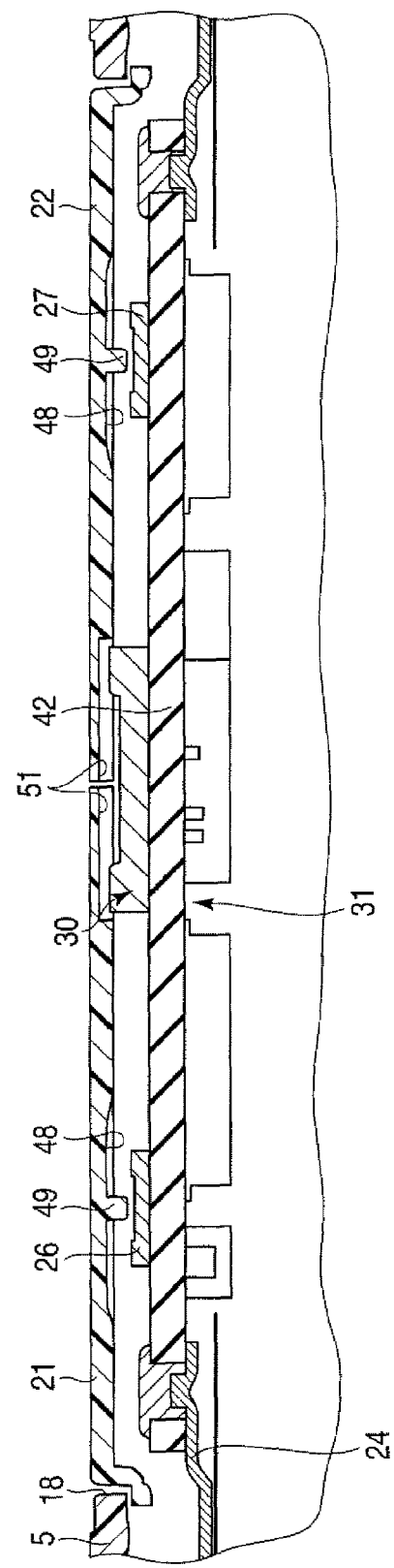
FIG. 25 is an exemplary cross-sectional view of the main unit according to the second embodiment of the present invention.

As shown in FIGS. 24 and 25, in the second model according to the present embodiment, the buttons 21, 22 of the second pad button section 36 are opposed to the fingerprint authentication unit 30 and cover the fingerprint authentication unit 30 from above. That is, the buttons 21, 22 of the second pad button section 36 cover the fingerprint authentication unit 30 to hide the fingerprint authentication unit 30 from the outside of the housing 4. As shown in FIGS. 23-25, each of the buttons 21, 22 of the second pad button section 36 comprises a recessed portion 51 in a part opposed to the fingerprint authentication unit 30 of the switch board 31 (first switch board 31). The recessed portion 51 avoids contact with the fingerprint authentication unit 30. That is, the recessed portion 51 makes a region which opposed to the fingerprint authentication unit 30 thinner than other regions in each of the buttons 21, 22. The configurations of the other structural elements of the portable computer 1 are the same as those of the first embodiment.

According to the portable computer 1 with the above-described configuration, increase in number of kinds of the cover members 11 can be suppressed when a plurality of models with different specifications are offered, as in the case of the first embodiment.

In the present embodiment, switching between models with and without the fingerprint authentication function can be performed by selection of the pad button section. That is, switching between versions with and without the fingerprint authentication function can be performed without increasing the number of kinds of the cover members 11 and the switch board 31. By preventing increase in number of kinds of the cover member 11 and the switch board 31, the manufacturing cost of the portable computer 1 can be decreased, and the parts inventory of the cover member 11 and the switch board 31 can be decreased.

In the case where the pair of buttons 21, 22 of the second pad button section 36 covers the fingerprint authentication unit 30 from above, since the fingerprint authentication unit 30 is not exposed to the outside of the housing 4, the portable computer 1 acquires an improved appearance.

In the case where each of the pair of buttons 21, 22 of the second pad button section 36 comprises a recessed portion 51 which avoids contact with the fingerprint authentication unit 30 in a part opposed to the fingerprint authentication unit 30 of the switch board 31, the buttons 21, 22 covering the fingerprint authentication unit 30 can move up and down without being interfered (i.e., without being contacted) by the fingerprint authentication unit 30, and thereby the operability of the buttons 21, 22 is improved.

The present invention is not limited to the above descriptions about the portable computer 1 according to the first and second embodiments of the present invention. The present invention can be embodied by modifying the structural elements without departing from the spirit or scope of the invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
a housing comprising an opening part;
a pad button section comprising a pair of buttons disposed in the opening part;
a switch board which is contained in the housing and on which a pair of switches operated via the buttons is mounted; and
a fixing member which fixes the switch board in the housing,
the housing comprising a cover member which forms a part of the housing, the cover member comprising the opening part,
one of a first switch board on which a fingerprint authentication unit is mounted between the switches and a second switch board on which no fingerprint authentication units are mounted being selectively adopted as the switch board,
one of a first pad button section which is formed along an inner rim of the opening part of the housing and in which a fingerprint authentication cover which exposes the fingerprint authentication unit outside of the housing is provided between the buttons in a longitudinal direction of the buttons, and a second pad button section which is formed along an inner rim of the opening part of the housing and in which the buttons are adjacent to each other in a longitudinal direction of the buttons being selectively adopted as the pad button section,
the first pad button section and the second pad button section each comprising an arm extending, in the longitudinal direction of the buttons, from an end part of each of the buttons in the longitudinal direction of the buttons, the end part not being adjacent to an adjacent button, the arm being fixed to the housing,
the cover member and the fixing member being identical in shape between a case where the first pad button section is adopted and a case where the second pad button section is adopted.

2. The electronic apparatus of claim 1, wherein the buttons of the first pad button section and the fingerprint authentication cover are integrally formed.

3. The electronic apparatus of claim 2, wherein the cover member comprises an engaging part for positioning on an inner surface of the cover member facing an inside of the housing, and the first pad button section comprises an engaging part configured to engage with the engaging part of the cover member and perform positioning of the buttons and the fingerprint authentication cover.

4. The electronic apparatus of claim 3, wherein the second pad button section comprises an engaging part configured to engage with the engaging part of the cover member usable for positioning of the first pad button section and perform positioning of the second pad button section.

5. The electronic apparatus of claim 4, wherein each of the buttons of each of the first and second pad button sections comprises a concave portion on a surface facing the switches of the switch board and a contact projection which projects from the concave portion toward a corresponding one of the switches.

6. The electronic apparatus of claim 1, wherein the first switch board is adopted and the second pad button section is adopted.

7. The electronic apparatus of claim 6, wherein the buttons of the second pad button section cover the fingerprint authentication unit from above.

8. The electronic apparatus of claim 7, wherein each of the buttons of the second pad button section comprises a recessed portion in a part facing the fingerprint authentication unit of the first switch board, the recessed portion avoiding contact with the fingerprint authentication unit.

9. An electronic apparatus comprising:
a housing comprising an opening part;
a pad button section comprising a pair of buttons disposed in the opening part;
a switch board which is contained in the housing and on which a pair of switches operated via the buttons is mounted; and
a fixing member which fixes the switch board in the housing,
the housing comprising a cover member which forms a part of the housing, the cover member comprising the opening part,
the switch board being provided with a fingerprint authentication unit mounted thereon between the switches,
one of a first pad button section which is formed along an inner rim of the opening part of the housing and in which a fingerprint authentication cover which exposes the fingerprint authentication unit outside of the housing is provided between the buttons in a longitudinal direction of the buttons, and a second pad button section which is formed along the inner rim of the opening part of the housing and in which the buttons are adjacent to each other in a longitudinal direction of the buttons being selectively adopted as the pad button section,
the first pad button section and the second pad button section each comprising an arm extending, in the longitudinal direction of the buttons, from an end part of each of the buttons in the longitudinal direction of the buttons, the end part not being adjacent to an adjacent button, the arm being fixed to the housing,
the cover member, and the switch board and the fixing member being identical in shape between a case where the first pad button section is adopted and a case where the second pad button section is adopted.

* * * * *